United States Patent
Rameau et al.

(10) Patent No.: US 11,875,964 B2
(45) Date of Patent: Jan. 16, 2024

(54) PASSIVE AND ACTIVE DIAMOND-BASED ELECTRON EMITTERS AND IONIZERS

(71) Applicant: Physical Sciences, Inc., Andover, MA (US)

(72) Inventors: Jonathan D. Rameau, Somerville, MA (US); Nicholas R. Craig, Somerville, MA (US)

(73) Assignee: Physical Sciences, Inc., Andover, MA (US)

( * ) Notice: Subject to any disclaimer, the term of this patent is extended or adjusted under 35 U.S.C. 154(b) by 240 days.

(21) Appl. No.: 17/366,552

(22) Filed: Jul. 2, 2021

(65) Prior Publication Data
US 2022/0037104 A1    Feb. 3, 2022

Related U.S. Application Data

(60) Provisional application No. 63/057,371, filed on Jul. 28, 2020.

(51) Int. Cl.
| | |
|---|---|
| H01J 1/304 | (2006.01) |
| H01J 3/02 | (2006.01) |
| H01J 9/02 | (2006.01) |
| B64G 1/22 | (2006.01) |
| C09D 5/24 | (2006.01) |
| C09D 163/00 | (2006.01) |

(52) U.S. Cl.
CPC ............ *H01J 1/3044* (2013.01); *B64G 1/226* (2013.01); *C09D 5/24* (2013.01); *C09D 163/00* (2013.01); *H01J 3/022* (2013.01); *H01J 9/025* (2013.01); *H01J 2201/30411* (2013.01); *H01J 2201/30457* (2013.01); *Y10S 427/103* (2013.01)

(58) Field of Classification Search
CPC .... H01J 1/30–3048; C09D 5/24; B64G 1/226
See application file for complete search history.

(56) References Cited

U.S. PATENT DOCUMENTS

| 5,536,193 A | * | 7/1996 | Kumar | H01J 1/3042 445/50 |
| 2013/0187123 A1 | * | 7/2013 | Kalish | H01L 49/006 977/939 |

FOREIGN PATENT DOCUMENTS

| CN | 111115625 A | * | 5/2020 |
| JP | H09185942 A | * | 7/1997 |
| JP | 2009026594 A | * | 2/2009 |
| JP | 2020199478 A | * | 12/2020 |

* cited by examiner

*Primary Examiner* — Mariceli Santiago
(74) *Attorney, Agent, or Firm* — Iandiorio Teska & Coleman, LLP

(57) ABSTRACT

A triple-point cathode coating and method wherein electrically conductive NEA diamond particles cast or mixed with the adhesive medium and electrically insulative NEA diamond particles are cast or mixed with the adhesive medium to form a plurality of exposed junctions between electrically conductive diamond particles and electrically insulative diamond particles to reduce any electrical charges on a structure coated with the coating.

20 Claims, 7 Drawing Sheets

FIG 2C

PASSIVE AND ACTIVE DIAMOND-BASED ELECTRON EMITTERS AND IONIZERS

RELATED APPLICATIONS

This application claims benefit of and priority to U.S. Provisional Application Ser. No. 63/057,371 filed Jul. 28, 2020, under 35 U.S.C. §§ 119, 120, 363, 365, and 37 C.F.R. § 1.55 and § 1.78, which is incorporated herein by this reference.

GOVERNMENT RIGHTS

This invention was made with U.S. Government support under Contract No. FA9453-18-P-0237 awarded by the Department of the Air Force. The Government may have certain rights in the subject invention.

FIELD OF THE INVENTION

In some aspects, this invention relates to the cold cathode emission of electrons from solid surfaces pertaining to the protection of spacecraft and the operation of other devices requiring emission of electrons into free space, as well as to the direct generation of ionized gases and plasmas via triple-point-based field desorption. Devices such as these have application in mass spectrometers, particle accelerators, spacecraft, and medical imaging devices such as X-Ray generators. Electron emitters specialized for the emission of large current densities into the space plasma environment also have application in the propellant-free propulsion of spacecraft within the magnetic fields of planetary bodies such as Earth and Jupiter using e.g. electrodynamic tethers, allowing for the indefinite operation of spacecraft, including the all-electric raising and lowering of orbits, in the vicinity of such planets.

BACKGROUND OF THE INVENTION

Spacecraft are subject to high levels of surface electrical charging sometimes up to many kilovolts of negative potentials. The results can be electrostatic discharges causing damage to the spacecraft and/or its components.

There have been numerous attempts at mitigation techniques including ion emitters and various coatings. Many such solutions are costly and complex.

Discharge of electrons can be accomplished either 1) passively (without power applied to a device) into the space plasma environment in lieu of using an active plasma contactor and 2) actively, for the ionization of gasses or on-demand production of electron beams for various applications with minimal production of waste heat and minimal use of electrical power.

Previously utilized methods of controllably discharging accumulated electrical charge on a spacecraft into the space plasma environment have utilized powered devices known as plasma contactors. The international space station (ISS), for example, uses a hollow cathode plasma contactor to aid in maintenance of the station's charge neutrality. These devices however consume a relatively large amount of power, consume a fuel supply and, as complicated active devices, may fail for any number of reasons, require maintenance or otherwise consume resources.

BRIEF SUMMARY OF THE INVENTION

The passive cathode coatings and devices described herein may require no power, cost far less to deploy, require no maintenance and no consumables, and add negligibly to a spacecraft's thermal and weight budget, all clear advantages over the current state of the art. Several devices have been described and/or tested that utilize triple-point junctions—the intersection at a point of a plasma, a solid electrical conductor and a solid electrical insulator—for the passive emission of electrons into the space environment. Electron charges accumulated from the space environment on spacecraft induce a large voltage between the spacecraft and the surrounding space plasma environment which can cause destructive and, sometimes, lethal (to the spacecraft) electrostatic discharges. Variations of the tripe-point approach to releasing electrons safely have utilized metal particles decorated onto an insulating substrate such as various kinds of glasses, formation of lithographically patterned metallic islands on insulating glass or insulating diamond substrates, and even attempts to impart a negative electron affinity (NEA) to insulating diamond substrates in order to lower the potential barrier to electron emission. These previous of triple-point devices have suffered a number of flaws severely limiting their practical application for spacecraft protection. These flaws are, chiefly, 1) devices showing high current emission tend to burn out (i.e. vaporize), severely limiting their lifetime, 2) devices are produced either entirely or in part from materials that degrade severely or are destroyed by the space environment, particularly by atomic oxygen (AO) bombardment encountered in low Earth orbit (LEO) and 3) most practical devices are produced in small quantities using low yield, expensive and time-consuming lithographic techniques.

The devices and coatings described herein allow for safe, passive discharge of electrons into the space environment at potentials much lower than are dangerous to spacecraft, thereby protecting the spacecraft from uncontrolled, high voltage electrostatic discharges in space. The devices and coatings are robust against exposure to the LEO environment, highly efficient at emitting electrons, add minimally to a spacecraft's size, weight, thermal management and cost, add nothing to a spacecraft's energy usage and cost relatively little compared to present devices, both active and passive.

A particularly attractive type of electron emitter is the Spindt cathode. The attractive aspects of Spindt cathodes are their ability to be switched on and off at will, ultra-low power consumption, low operating voltages (between several and ~100 V), low thermal load, overall compactness and, relative to a hot filament cathode, physical robustness. Application of a large voltage between the gate and emission tips induce field emission of electrons from the tips, accelerating them through the holes in the gate electrode and on into free space. The main problems with Spindt cathodes, which are lithographically defined, dense, parallel (electronically) arrays of field emitters are 1) the cost and difficulty of fabricating them by traditional solid state device lithographic techniques and 2) their tendency to fail owing to the fact that a single shorting path between an emitter and a gate electrode will short the entire device, rendering it useless and 3) the tendency for emission tips to spontaneously fail over time, events that progressively degrade device performance and possibly originate short faults themselves.

Diamond, because of its superlative electronic and physical properties is a promising candidate for field emission tips, even in a massively parallel Spindt-type layout. Relevant prior art has demonstrated a Spindt-type cathode in which discreet metallic emission tips were replaced with sub-micron diamond grits. This device showed exceptionally low turn-on voltages of around 2 V. The device was created by pushing diamond grits into lithographically pre-defined holes in the device structure. Therefore, this device was still subject to terminal electrical shorts which in practice did render reliable production of the devices impossible, while the diamonds used were not obviously conducting or possessing an NEA surface. Another group demonstrated the creation of conducting diamond field emission tips with NEA surfaces in which the front gate electrode of the device was a Transmission Electron Microscope (TEM) grid physically suspended above the field emitters. While this demonstrated that a suspended grid could be used to excite diamond field emission, the tips themselves were still created using the specialized lithographic techniques uniquely required by diamond, making them incredibly expensive and difficult to produce while limiting the packing density of tips on the device.

Featured is a triple-point cathode coating comprising an electrically conductive adhesive medium. Electrically conductive NEA diamond particles are cast onto or mixed with the adhesive medium. Electrically insulative NEA diamond particles are cast onto or mixed with the adhesive medium. The result is a plurality of exposed junctions between electrically conductive diamond particles and the electrically insulative diamond particles to reduce any electrical charges on a structure coated with the coating.

The electrically conductive NEA diamond particles preferably contact electrically insulative NEA diamond particles at locations not submerged in the adhesive medium. The electrically conductive NEA diamond particles and the electrically insulative particles may have a grit size of between 0.5 microns to 150 microns. The conductive NEA diamond particles and the electrically insulative diamond particles can be mixed together before casting or mixing them with the adhesive medium. The adhesive medium preferably includes silver.

Also featured is an ionizer comprising a substrate and a triple-point cathode coating associated with the substrate. The coating includes an electrically conductive adhesive medium, electrically conductive NEA diamond particles cast or mixed with the adhesive medium, and electrically insulative NEA diamond particles cast or mixed with the adhesive medium forming a plurality of exposed junctions between electrically conductive diamond particles and electrically insulating diamond particles to reduce any electrical charges on the substrate. The ionizer may further include a conducting gate electrode supported above the coating and a voltage source connected between the gate electrode and the coating to produce ions by field desorption on the diamonds and subsequent electron or ion impact ionization on neutral adsorbed or gas phase species to produce further ions.

The ionizer may further include a piezoelectric material between the substrate and the coating. The ionizer may further include a voltage source for the piezoelectric material to adjust the distance between the gate electrode and the diamond coating to optimize field emissions from the coating.

The ionizer may further include an electrically conducting layer behind the coating.

Also featured is a method of producing a triple-point cathode. An electrically conductive adhesive medium is prepared. Electrically conductive NEA diamond particles are cast onto or mixed with the adhesive medium. Electrically insulative NEA diamond particles are cast onto or mixed with the adhesive medium. A plurality of exposed junctions are formed between the electrically conductive NEA diamond particles and the electrically insulative NEA diamond particles.

The electrically conductive NEA particles preferably contact electrically insulative NEA diamond particles at locations not submerged in the adhesive medium.

Preparing the adhesive medium may include mixing a two part epoxy. In one example, the electrically conductive NEA diamond particles are mixed with electrically insulative NEA diamond particles, then that mixture is mixed with the adhesive medium, and then additional adhesive is added to that mixture to produce a low-viscosity final mixture.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 1A is a cutaway view showing field emission tips grown in pits beneath front gate electrodes and FIG. 1B is a top view showing an array of emitters;

DETAILED DESCRIPTION OF THE INVENTION

Figure 1A:
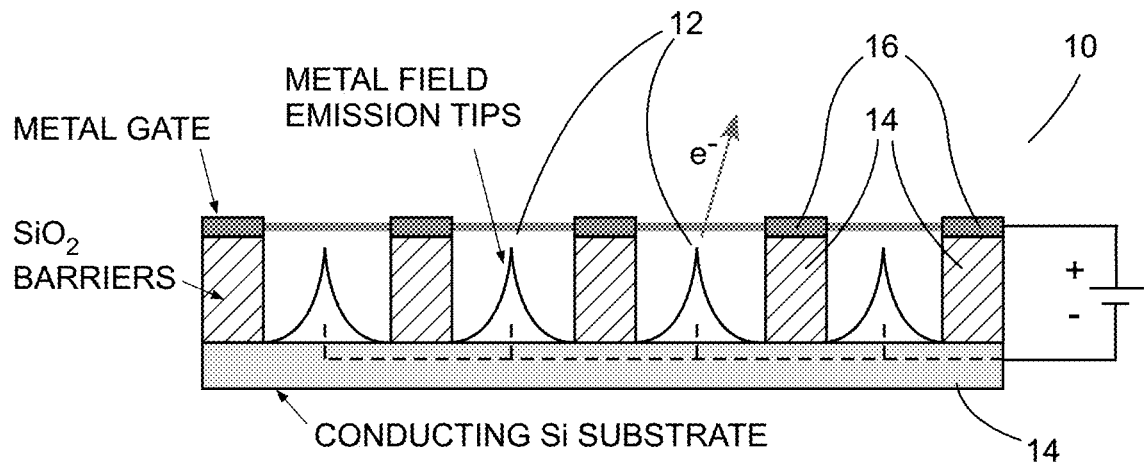
FIGS. 1A and 1B are a schematic view of a prior art Spindt-type field emission cathode, where

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Passive electron emission in an externally generated plasma has been demonstrated in a laboratory setting using deuterium (D)-terminated diamond grit and hydrogen (H)-terminated ultrananocrystalline diamond (UNCD) triple-point cathode devices. Ionization of neutral gases and formation of plasma by actively biasing diamond grit and UNCD triple-point devices has been demonstrated in the lab under reverse (negative) bias.

Forward (positive) bias ionization also occurs for triple-point junction devices. Devices fabricated entirely from H- or D-terminated conducting diamond grits may emit electrons when paired with a suspended front grid acting as a gate. Single crystal diamond, UNCD or diamond grit may attain a surface texture similar to what is obtained by exposure of such materials in Low Earth Orbit (LEO) to hyperthermal atomic oxygen (O), and that the surfaces thus formed are also effective active electron emitters (cathodes) when placed behind a suspended grid electrode and biased.

The problem of how to safely discharge accumulated electrostatic charge into the space environment via a coating or device capable of surviving long duration spaceflight, without applying power to the coatings or devices and without materially impacting the size, weight, power or thermal load of a spacecraft, is preferably solved in one embodiment by a) formulating a paintable cathode coating composed of a mixture of conducting and insulating H- or D-terminated diamond grits and a low-outgassing, inorganic, electrically and thermally conductive epoxy such that when painted onto a spacecraft or component a large number of conductor-insulator diamond junctions—exploiting the so-called triple-point effect—are exposed on the space-facing surface to which it is applied and b) creating by chemical vapor deposition (CVD) and diamond lithographic processing, ultrananocrystalline diamond (UNCD) bilayer devices where conducting and insulating diamond layers, hydrogen or deuterium terminated, are contacted to each other, forming triple-point junctions exposed to space, and placed in electrical connection to a spacecraft.

The problem of how to ionize neutral gasses or other molecular analytes across a wide surface area using a material with a very low erosion rate is preferably solved by applying high positive voltages to the H- or D-terminated diamond grit-based coatings described above which produces a large electric field between the conducting and insulating components that causes neutral atoms in the vicinity of the junctions to ionize, with the ions subsequently repelled from the surface. Application of high negative voltages also ionizes gasses, causing electrons to be accelerated at high energies (tens to hundreds of electron volts (eV)) into the surrounding gas and thereby ionizing it further, achieving a similar effect as demonstrated in laboratory experiments.

The problem of how to economically create high density ($>10^9$ cm$^{-2}$) of nanometer-scale diamond electron field emission tips for use in electron emission sources and ionizers, without use of lithography, is preferably solved by exposing conducting diamond grits, single crystal diamonds, single crystal diamond films, polycrystalline diamond films or ultrananocrystalline diamond (UNCD) films to a calibrated, highly directional bombardment by hyperthermal, neutral atomic oxygen (AO) atoms possessing kinetic energies up to 15 eV such that dense arrays of nanometer-diameter or atomically sharp diamond rods and cones are formed on the surfaces of the diamond materials, surrounded by micron-plus deep wells and trenches, followed by termination of these textured diamonds by H or D to induce a negative electron affinity surface. See also U.S. Pat. No. 4,894,511, incorporated herein by this reference disclosing the creation of highly directional, hyperthermal fluxes of neutral AO useful for the texturing of diamond in this way.

The problem of how to create cold, low power, high current, fault tolerant, fault recovering electron emitters comprised of a very large number ($>10^9$ cm$^{-2}$) of field emission tips, without lithographic processing, is preferably solved by the use of (a) sub-micron diameter, conducting, hydrogen or deuterium terminated diamond grits (with or without AO texturing as described above) adhered to a solid substrate or (b) adherence of "FAST textured" (as described above) electrically conducting diamond crystal or film, be the diamond crystal or film a "single crystal", polycrystal or UNCD, to the top of a piezoelectric transducer (PZT), which is used to position the diamonds with nanometer accuracy beneath an external grid electrode and then reverse (negatively) biasing the conducting diamonds relative to the grid electrode, thereby inducing a field emission current from the diamond tips.

Figure 1B:
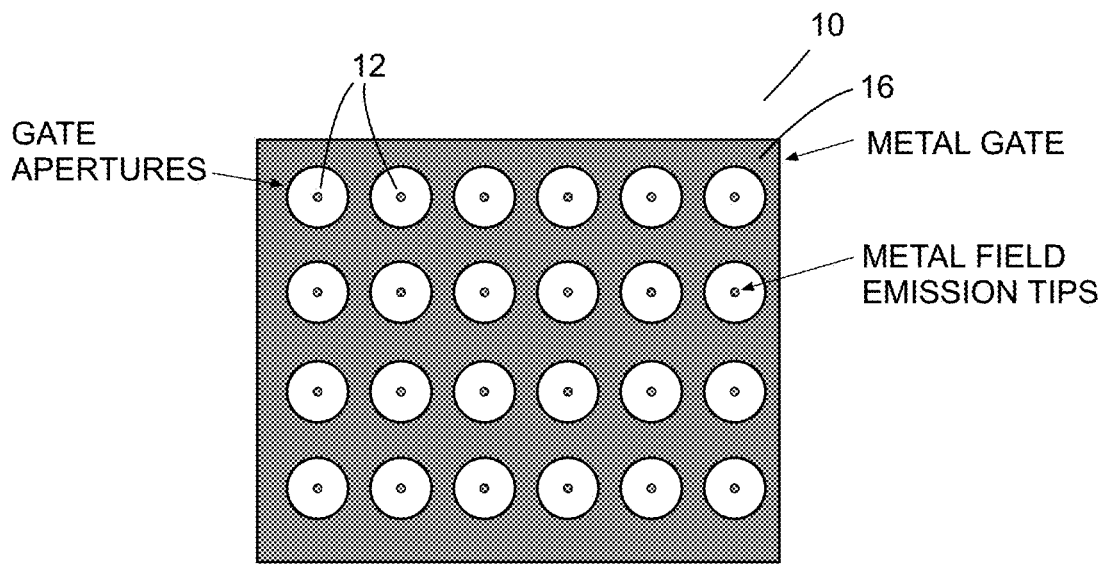

FIG. 1A depicts a prior art spinet-type field emission cathode 10 with field emission tips 12 on conducting Si substrate 14 and SiO$_2$ barriers 14 supporting metal gate 16. See also FIG. 1B.

Figure 2A:
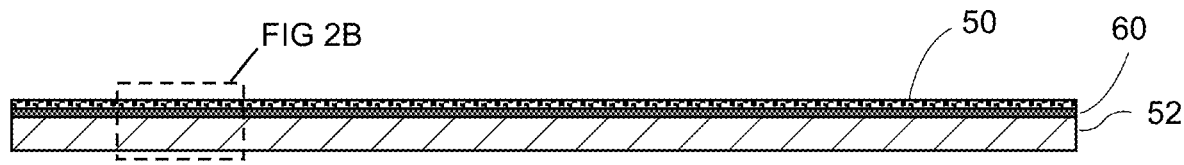
FIGS. 2A-2C depict a diamond grit-based triple-point cathode coating at different length scales, showing the coating profile, a representation of a large collection of insulating and conducting diamond grits and as the finest level an individual triple point junction between an electrically conducting and insulating diamond micro- or nano-crystal, respectively.
Figure 2B:
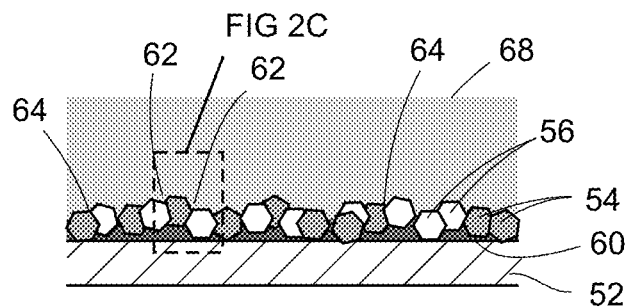
Figure 2C:
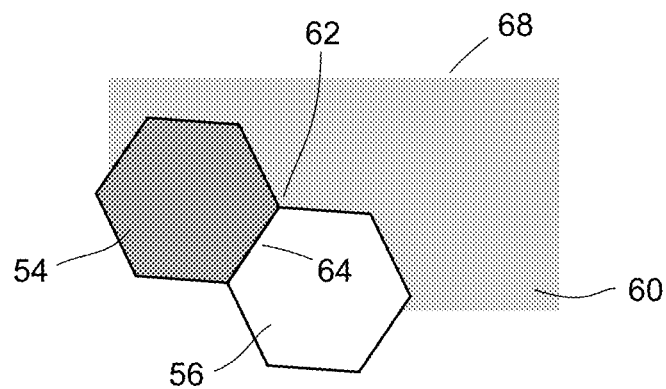

One innovation includes creating new triple-point devices in which both the conducting and insulating points are made of diamond, both types of diamond possessing an NEA surface and to create paintable coatings in which large numbers ($>10^6$) of junctions are exposed on the surface of the coating and created without the aid of lithography. A multi-scale schematic showing the parts of the coating is shown in FIG. 2A-2C.

A triple-point coating 50 is applied to a spacecraft exterior surface 52. Electrically conductive NEA diamond particles 56 are dry-mixed with electrically insulating NEA diamond particles 56 and the mixture cast onto or mixed with a preferably inorganic, electrically conductive adhesive medium 66 (e.g., an epoxy). There are a plurality of exposed junctions 62 between the electrically conductive diamond particles 54 and electrically insulative diamond particles 56 to reduce any electrical charges on a spacecraft structure coated with the coating. Electrically conductive diamond particles 54 physically contact electrically insulating diamond particles 56 at locations 64 not submerged in the adhesive medium, which functions to retain the diamond particles and also to provide an electrical link to the earth ground of the spacecraft. The result is in electrical link to ground via the conductive adhesive which carries charges on the surface of the spacecraft to the diamond particles' junctions which passively emit the charges to the space plasma environment via the triple point effect.

Figure 3A:
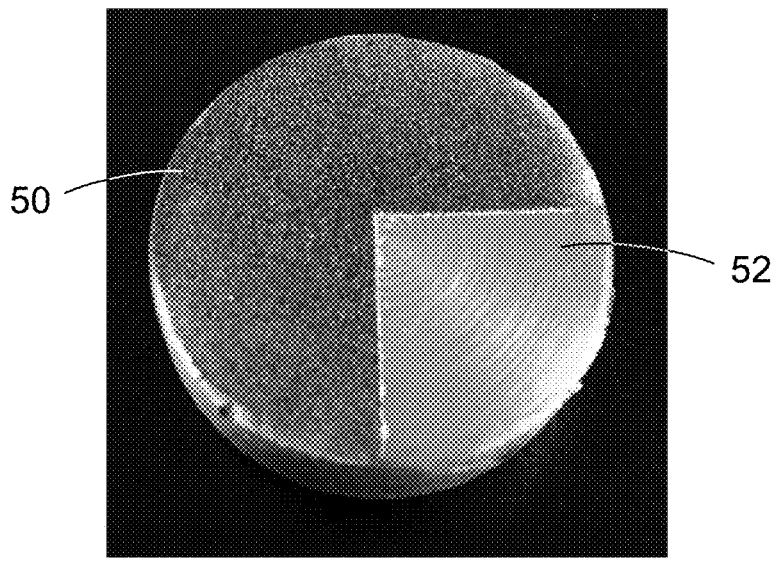
FIG. 3A shows a diamond grit triple point cathode coating applied to and cured on a piece of Kapton® tape and FIG. 3B depicts a scanning electron microscope (SEM) micrograph of a similar diamond grit triple point cathode coating.
Figure 3B:
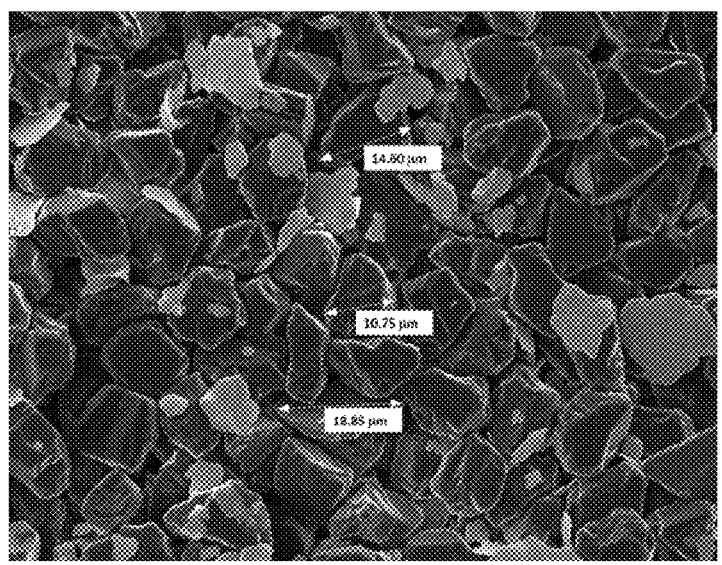
Figure 4A:
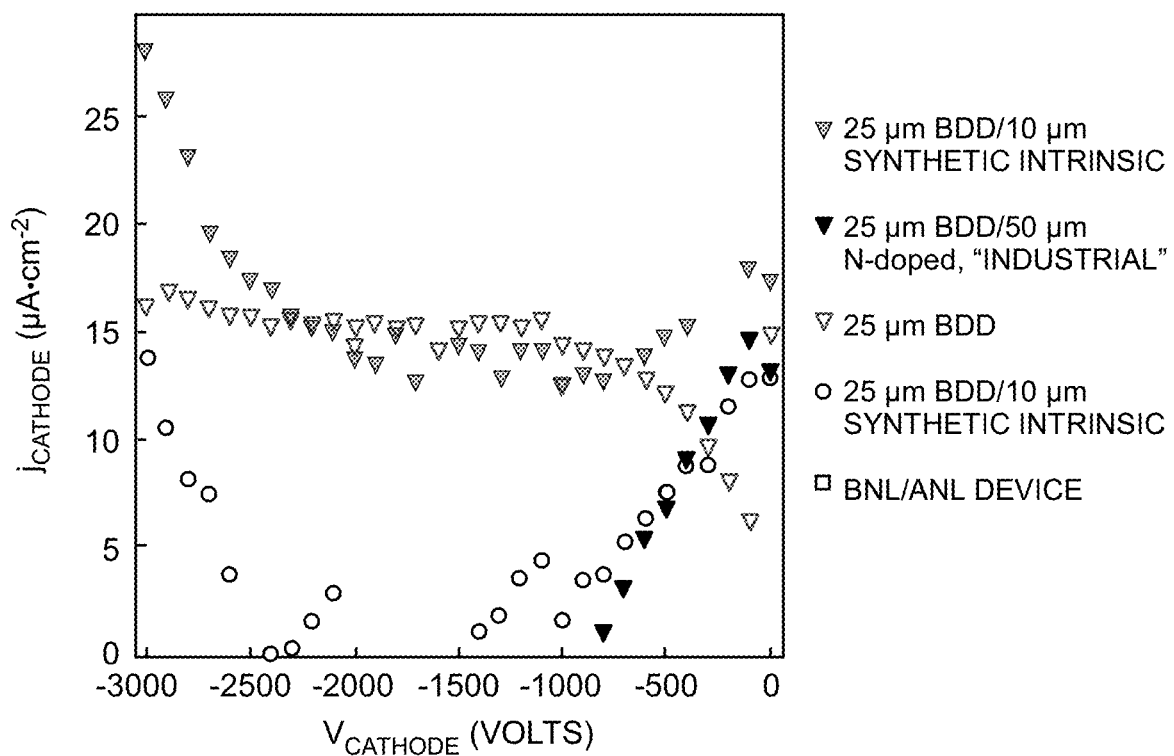
FIG. 4A is a plot of electron emission current density in an externally generated plasma from several diamond grit cathode coating formulations as a function of cathode bias and FIG. 4B shows the same data with emission from the a lithographically patterned ultrananocrystalline diamond (UNCD) device included for comparison.
Figure 4B:
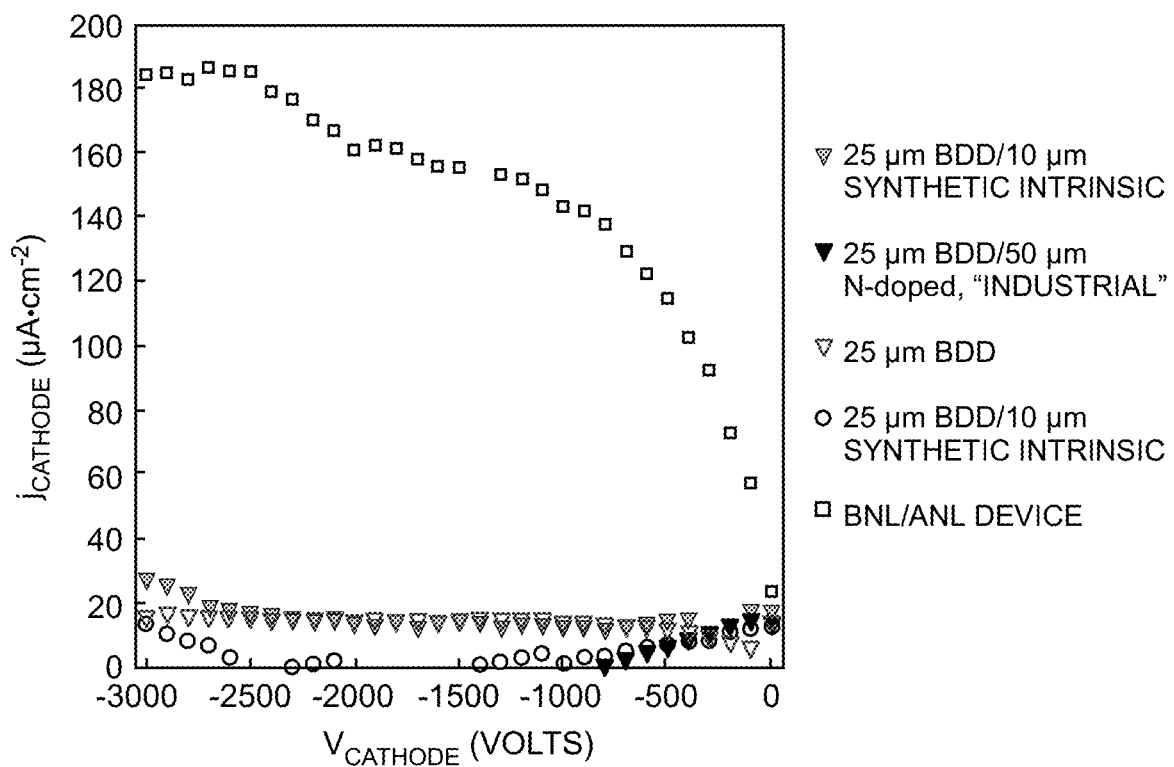
Figure 5:
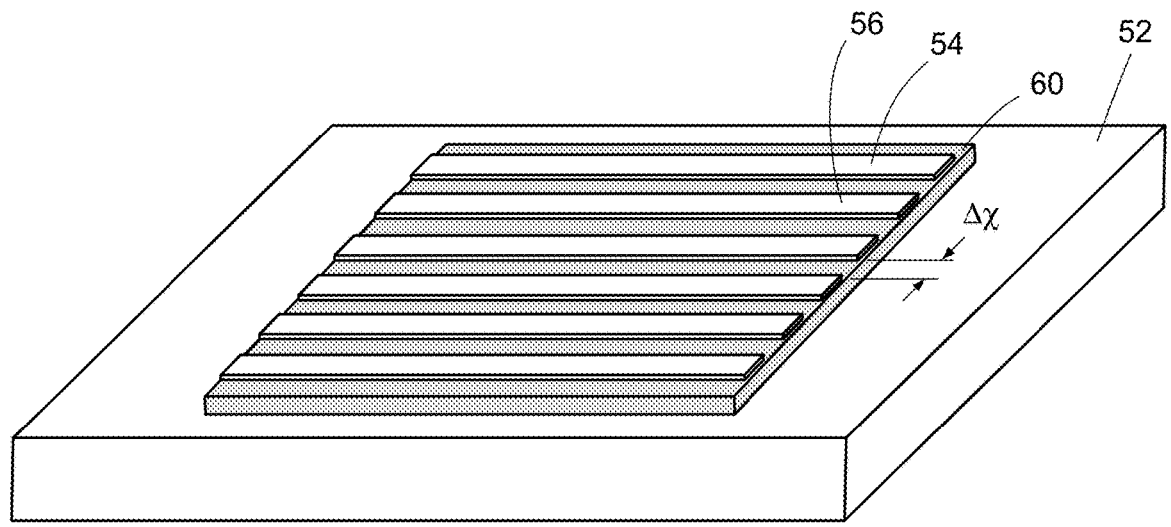
FIG. 5 is a labeled CAD rendering of a lithographically defined triple point diamond device where triple point junctions occur at the intersection of electrically conducting and insulating thin diamond films.
Figure 6:
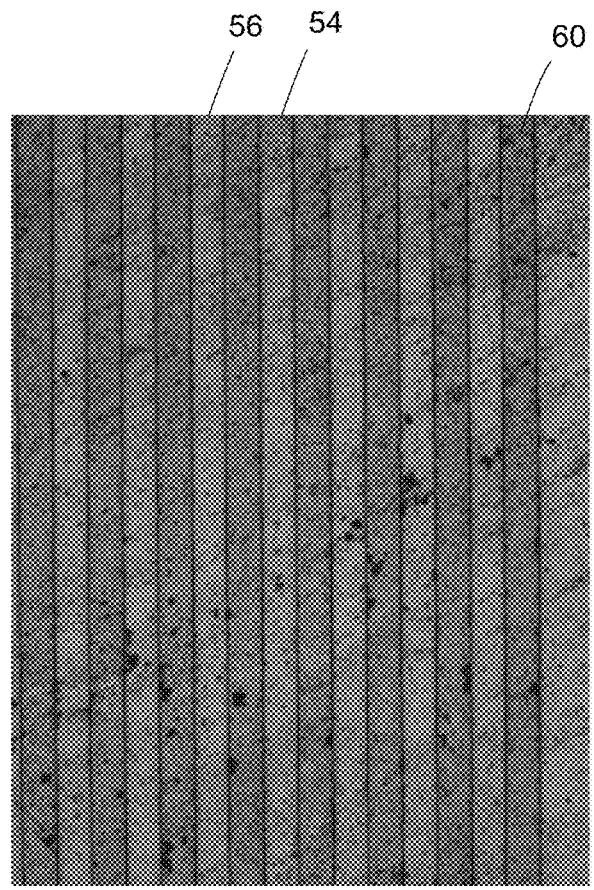
FIG. 6 is a set of optical micrographs of lithographically defined triple point diamond devices taken at different magnifications. Diamonds are H or D terminated.

Examples of an actual diamond grit-based coating, comprised of equal quantities of conducting and insulating diamond grits, is shown in FIG. 3A. FIG. 3B shows an SEM micrograph of a similar coating in which the micron-scale nature of the diamond grits and the high density of inter-grit junctions can be observed directly, as well as the relative lack of residual silver particles or epoxy on the applied coating surface. These diamond-diamond junctions have the advantage of being highly efficient electron emitters due to the very large number of triple-point junctions exposed to space plasma 68, FIGS. 2B and 2C, while being robust against degradation in the LEO environment due, for example, to naturally occurring AO bombardment. FIGS. 4A-48 show emission current density from several cathode coatings, as well as emission from an all-diamond monolithic device produced using chemical vapor deposition (CVD)-grown ultrananocrystalline diamond (UNCD) films later patterned lithographically into a structure such as that shown in FIGS. 5 and 6.

The coatings in particular are vastly less expensive to produce than discreet devices and may be applied on any surface or in any quantity with low impact on SWaP-C of a spacecraft. The invention, in one embodiment, thus addresses the three problems cited above with respect to previously realized passive triple-point devices and coatings. The solid-state device, while too thin for prolonged use in LEO, and quite a bit more involved to produce, performs well as a "pristine" triple-point device. Note that the minimum current density to compensate for a spacecraft of given area is 0.4 nA/cm$^2$, quite a bit smaller than either the coatings or device achieve in practice. Therefore, comparatively little of either passive contactor is required to dissipate excess charge from a spacecraft.

Figure 7:
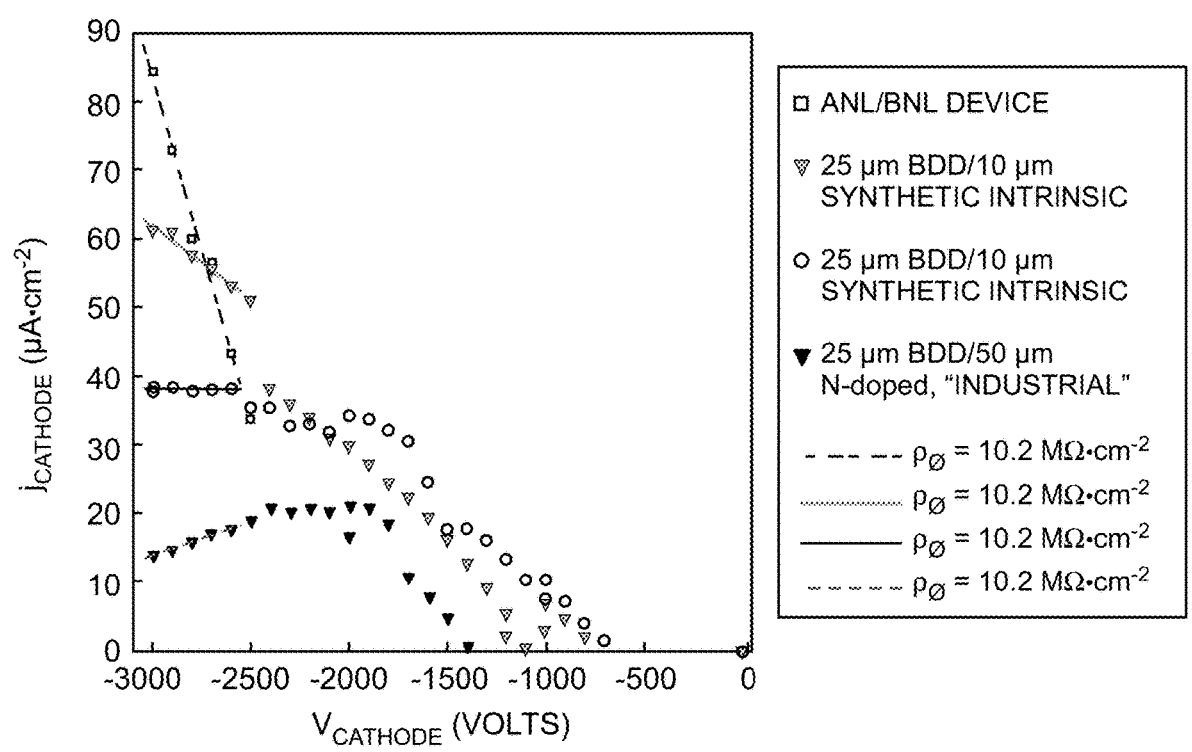
FIG. 7 is a plot of lab-measured current emission density from diamond film and grit triple-point cathode devices due to ionization of neutral gas when a voltage is applied to the films and devices. Diamonds are H or D terminated.

The same coatings, when used actively by applying large voltages to them (>300 V), may constitute efficient ionizers of neutral gases, effectively rendering them as inexpensive, highly dense field desorption ionizers. For the coatings, this is particularly useful as it means large areas may be efficiently coated and converted to field effect ionizers, with practical applications in the fields of plasma research and, particularly, space-based mass spectroscopy and spectrometry. For biological and astrobiological applications this advance is particularly relevant as, for larger molecules and particles, the field ionization is "soft", preserving much of the molecular structure of the targets. Ionization current density as a function of applied voltage for several coatings and a lithographic device are shown in FIG. 7. The neutral gas was a 95%/5% mixture of N$_2$ and H$_2$, respectively, at 3 mTorr pressure.

One innovation is to remove custom lithography from the equation entirely, or substantially, while using conducting diamonds with NEA surfaces as the emission elements and, functionalizing the emission in such a way as to remove or render recoverable shorts that would destroy other devices.

Figure 8:
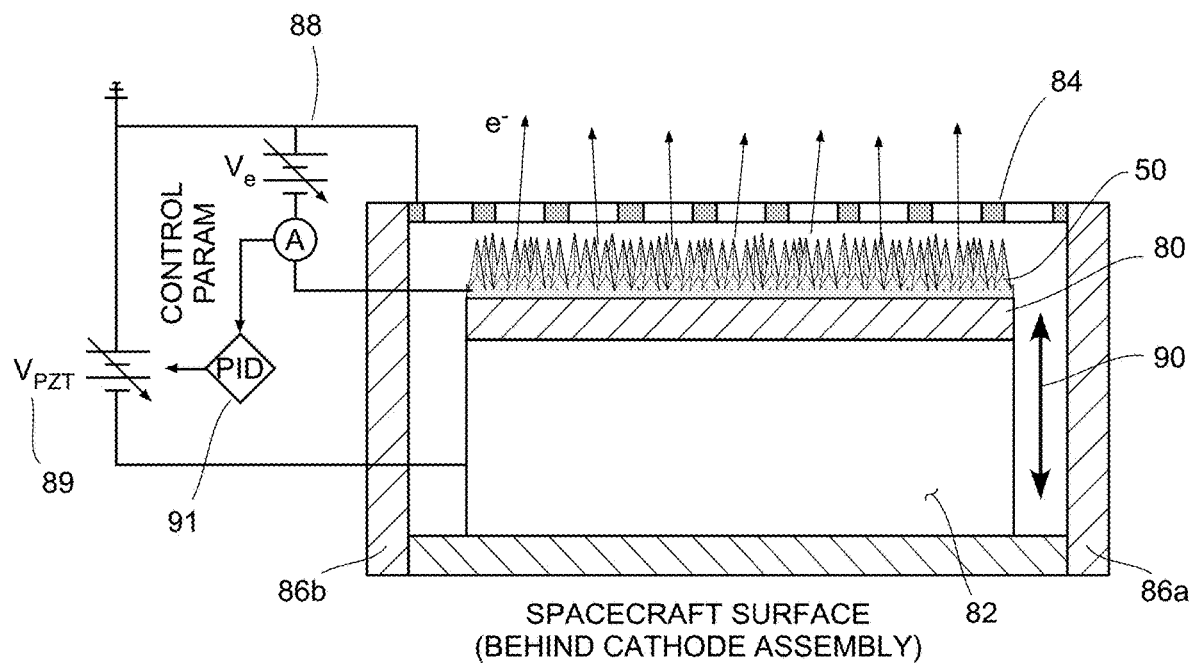
FIG. 8 is a schematic of a FAST textured diamond film, crystal or grit functionalized into an active cathode device when mounted on a piezoelectric transducer stack (PZT) beneath an electrically conducting grid electrode.
Figure 9:
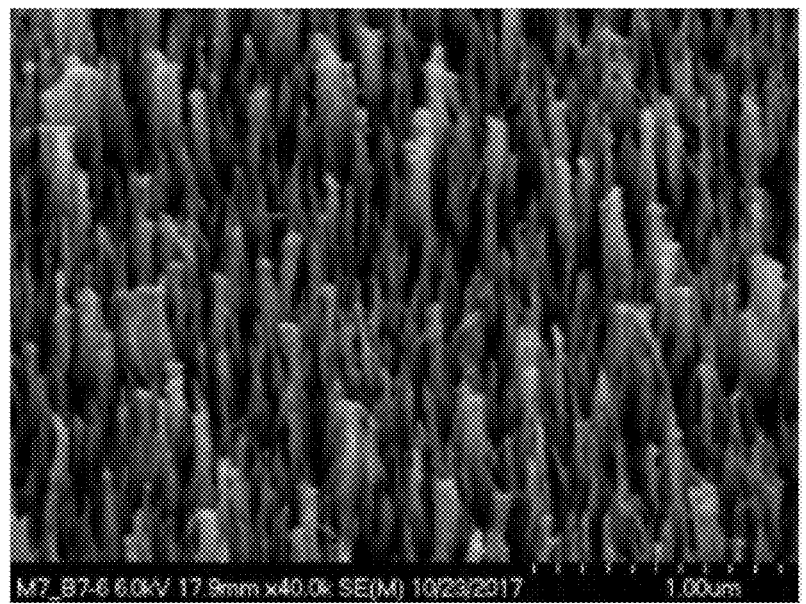
FIG. 9 is an electron micrograph of single crystal synthetic diamond bombarded by atomic oxygen in low Earth orbit for 1.5 years aboard the International Space Station.

FIG. 8 shows coating 50 on optional electrically conductive layer 80 itself disposed on substrate 82 (e.g., a piezoelectric stack). Conductive gate electrode 84 (e.g., a metallic grid or screen) is supported above coating 50 via supports 86a and 86b. Voltage source 88 is connected to grid 84 and coating layer 50 to induce field emissions of electrons from the diamond tips which are then accelerated through the gate grid electrode 84 into free space.

One device leverages the hydrogen- or deuterium-terminated. Boron-doped diamond grits (D:BDD) by coating a conducting electrode in D:BDD and then inducing field emission by means of a suspended grid 84 such as a TEM grid. Emission coating to grid distance may be optimized and maintained by placing the cathode on a piezoelectric stack capable of modulating the emitter-grid separation as shown by arrow 90. Feedback is used to maintain optimal distance, with the emission current as the control parameter, controlling voltage to the piezo stack via a control loop implemented by PID (or other) controller 89. The emission current is measured by controller 89 based on the voltage applied to the coating by voltage source 88 and controller 89 adjusts the voltage supplied to voltage source 91 to piezoelectric stack 82 to adjust the distance between coating 50 and grid 84 until the field emission is optimized.

Another innovation along these lines is the creation of an ultra-dense array of field emitter tips on the surface of a single crystal or UNCD diamond film by exposing the film to hyperthermal atomic oxygen bombardment. Such bombardment has been demonstrated in LEO experiments to produce on the order of 10$^9$ such tips on the surface of [100]-oriented diamond crystals. As with the grit-based cathode, the film, on a conducting substrate, is placed on a piezo stack and its distance to an external grid modulated. An example of a functionalized device including FAST textured diamond, a detached grid and PZT-controlled separation between grid and diamond. This method of forming an emitter array not only does away with lithography but produces an order of magnitude more emission tips per unit area than can be achieved by contemporary lithographic processes on diamond. This enables potentially an order of magnitude increase in emission current density from such devices. H or D termination of the diamond film after AO bombardment gives the emitters an NEA surface.

Besides offering superior robustness and potentially superior overall performance due to the massive increase in emission tip quantity, these devices have many advantages over so-called hot cathodes such as filaments in terms of heat load, power consumption and fragility.

Passive Cathode Coatings for Spacecraft Charge Mitigation

The active components may include mixtures of electrically conducting and insulating diamond grits that have been given an atomic H or D surface termination and adhered to a substrate surface using low-outgassing, electrically conductive, inorganic epoxy. The result may include formation to >10$^6$ cm$^{-2}$ junctions at randomly formed points of contact between conducting and insulating diamonds and the formulation of a "paint" allowing the coatings—comprised of the terminated diamonds and conducting epoxy—to be painted onto and cured on an arbitrary surface such that the diamonds sit on the surface of the coating with their junctions exposed to free space. In one example, forming all-diamond triple-point junctions, of using expressly H or D terminated diamond grits, and the method of combining the diamond grits and epoxy to allow their adhesion (as described above) is as follows. Note that quantities of all materials scale linearly, their content ratios, by weight, held constant.

A mixture of Epoxy Technologies Inc. E4110-LV inorganic, two part, low-outgassing silver epoxy, pre-mixed diamond grits and n-methyl-2-pyrrolidone (NMP) are used to form a diamond cathode solution that resembles a 'paint-like' substance that can be applied to various surfaces. E4110-LV is a silver-impregnated epoxy purchased from Epoxy Technology Inc. and includes two parts, Part A and Part B. NMP is commonly available from e.g. Sigma Aldrich (a.k.a. Sigma Millipore). A dry mixture of H- or D-terminated conducting and insulating diamond grits is prepared using e.g. a vortex mixture, the grit sizes and proportions depending on the final application. Grit sizes for both electrically conducting and insulating diamond grits range between 0.5 microns and 150 microns mean width, typically in sizes of 0.5, 10 microns, 25 microns, 50 microns, 100 microns and 150 microns, or any combination thereof, may be synthetic (produced e.g. by chemical vapor deposition or high pressure high temperature synthesis) or derived from naturally occurring diamonds. Diamond grits of these sizes, both conducting, such as heavily Boron doped diamond, and insulating diamond, are available commercially. The following quantities scale linearly for larger batch sizes. First, 1.1 g of E4110-LV epoxy is produced using 1 g Part A and 0.1 g Part B, a 10:1 ratio. The Part B may also be added as the final step to begin the cure process for a pre-mixed batch of paint, the latter having a shelf life of at least 6 months. Once the A and B parts of the epoxy are combined, the mixture has an approximately 12 hour pot life. Regardless, Part B is mixed in with Part A (and other components) 6.5 minutes in a FlackTek, Inc. (for example) SpeedMixer to ensure a uniform solution. Next, 0.25 g of NMP is added to the epoxy and these components are again mixed for 6.5 minutes in the speed mixer. After the mixture is examined it should appear uniform. 0.25 g is measured out into a separate container. 1g of diamond grit mixture (containing a mixture of electrically conducting and insulating diamond grits) is added to this container and these two components are again mixed for 6.5 minutes in the speed mixture. After the first mix, another 0.25 g of NMP is added to the container and the three components again mixed for 6.5 minutes. The resulting solution is a low-viscosity mixture containing ~70% diamond grit. Adding the second batch of NMP after adding the diamonds and mixing ensures the silver particles in the E4110-LV do not separate out from the solution which would adversely impact the conductivity of the coating after curing.

One preferred method of creating samples is for the diamond cathode mixture to be cast onto a substrate using a doctor-blade system. For example, to cast the cathode coating with the doctor-blade, a 1 mL syringe is used to acquire 0.4-0.5 mL of the solution. This is then extruded in a line onto the substrate ~2 mm away from the doctor-blade. Finally, the blade is set to 50 microns and drawn across the substrate to create a thin, even coating. This substrate is then placed in a 110 C vacuum oven and left to cure overnight. Alternatively, the applied coating may be left to cure for 1-2 days at ambient conditions. This procedure is effective at producing thin, uniform coatings of diamond cathode material with strong adhesion to a wide variety of substrate materials, including copper, aluminum, glass, steel, Indium-Tin-Oxide (ITO) and Kapton®.

The diamond films described above are connected electrically to a spacecraft by simply being painted onto its exterior. When a spacecraft is charged negative by electron bombardment originating from deep space or the sun the spacecraft's potential relative to the surrounding positive background space plasma is driven negative by up to several thousand volts. This increasing negative potential is relieved by the emission of electrons into the plasma environment by the triple-point cathode coating.

Active Field Ionization Coating

These coatings may be identical to the ones described immediately above but are externally powered. When a high voltage is applied to the coating substrate, a large electric potential builds up between the conducing and insulating components of the coating. The coatings are comprised of dry-mixed combinations of electrically conducting and insulating BDD and ID grits of sizes ranging between 0.5 microns and 150 microns mean width or any combination thereof, bound to the surface of an electrically conducting, inorganic epoxy prepared and deposited using the methods described above. Electrically neutral gases, molecules or other dilute analytes are ionized when they enter the junction regions of the coatings formed at the contact points between insulating and conducting diamond grits. If the coating is biased negatively by at least −500 V, analytes are ionized by the high electric field at the junctions and the ions are attracted to the coating and are adsorbed while electrons are accelerated outward. If the gas density is high enough, the repelled electrons ionize further neutral atoms or molecules by impact ionization. If positively biased, ions are repelled once created, where they may also ionize other atoms or molecules. If the gas density surrounding the ionization coating is sufficiently large a sustained plasma is formed and the junctions become true triple-point junctions as described above.

Monolithic Diamond Plasma Contactor and Ionizer

The theory of operation of the monolithic diamond plasma contactor is the same as that of the passive and active coatings described above. However, the diamond junctions are formed by First depositing a layer of one type of diamond (typically conducting, Boron, Nitrogen or Phosphorus doped diamond) and then a layer of the other type of diamond (typically insulating intrinsic or slightly nitrogen doped diamond). The diamond films may be either single crystal, polycrystalline or ultrananocrystalline diamond (UNCD). The deposition is performed by any suitable method, though chemical vapor deposition (CVD) is the most common. Following layer deposition, the upper layer is etched through to the lower layer in such a way as to leave a pattern such as lines or grids of the upper layer. The intersection of the insulating and conducting layers forms the triple-point junction. The lithography is accomplished by depositing patterned Nickel in such a way as to form a negative image on the surface of the upper layer device structure. This Nickel forms a mask for oxygen plasma etching of the diamond, after which the nickel layer is lifted off or etched away.

One improvement over prior art is that all-diamond triple point ionizers and plasma contactors are formed, whereas the prior lithographic art utilized only insulating diamond. The new art allows a fully integrated, monolithic diamond device with all-NEA surfaces and that is highly robust against AO bombardment found in LEO.

Diamond Grit Field Emission Cathode Device

Diamond grit field emission cathode devices are created by spreading a single layer of diamond grits onto an electrically conducting substrate. The diamond grits are electrically conducting, either through Boron, Phosphorus, Nitrogen or other dopants introduced during the diamond growth process (be that synthetic or natural). The diamond grits are adhered to the substrate either by use of a low-outgassing, conductive, inorganic epoxy in the manner described above for the creation of passive plasma contactors, or by heating the substrate to the point that the diamond grits are wetted by the substrate itself and adhere. There exist several methods of achieving H or D termination of the diamond grits required to impart to them an NEA surface. If epoxy is used to adhere the diamonds to the substrate, the diamond grits are H or D terminated prior to affixing them to the substrate. If the diamonds are melt-affixed to the substrate, two methods present themselves.

For substrates or substrate coatings for which the melting temperature exceeds 850° C., the diamond grits are placed on the substrate and the substrate heated to near or just above the melting point. If heated to the "softening" temperature, a slight physical pressure is placed on the diamonds. Following this anneal step, the temperature is lowered to between 550 and 800'C and the diamonds exposed to monatomic H or D, then cooled to below 550° C., at which point the H or D source is shut off and the material is cooled to room temperature. For substrate or substrate coatings with melting temperatures between 550 and 850° C., such as Aluminum, Magnesium or alloys thereof, the anneal to softening/melting and H/D termination steps are combined, followed by cooling to room temperature. The diamond grits have dimensions of between 500 nm (mean full width) and 250 microns (mean full width).

Following creation of the conducting NEA diamond grit terminated substrate, the substrate is placed atop either a piezoelectric transducer (PZT) or a manually actuated linear positioning stage with nanometer-scale precision tuning utilizing e.g. differential lead screws. Either the PZT or manual positioner are used to raise/lower the diamond grit surface, normal to that surface's face, relative to a high mesh, electrically conducting wire grid. Common examples of such grids are high mesh transmission electron microscopy (TEM) grids. The device is operated by placing a negative bias on the substrate containing the conducting diamond relative to the conducting grid. The bias induces an electric field between the diamonds and the grids, which is concentrated at the sharp tips of the diamonds. For sufficiently close spacing between the diamonds and the grid, the tip field is enhanced enough to induce field emission from the diamonds, with emitted electrons accelerated through the apertures of the wire grid and into free space. The diamond-grid separation is tuned by means of the actuator or PZT, the latter of which is operated by application of a control voltage whose magnitude is proportional to the PZT length and therefore the diamond coating-grid spacing. For use in dynamic environments for which mechanical stabilization is useful or for additional stabilization of emission currents and automatic tuning of diamond-grid separation distances, the PZT drive voltage is tuned using a feedback loop, such as a PID control loop, for which the emission current or extraction voltage is used as the control parameter. Besides allowing active mechanical stabilization of the emission field through precise control of the diamond-mesh distance, the ability to physically tune the relative positions of the diamonds and grid allows for a degree of fault recovery from shorts. To wit, any physical short between diamonds and grid is removed by backing the diamond surface away from the grid until an open circuit is re-attained or emission current is again observed.

The creation and operation of the diamond grit field emission cathodes entails several advances over prior art. The use of diamond grits in a Spindt-type field emission device have been reported, in which nanoscale diamonds without deliberate H or D termination were pushed into the holes of a monolithic back electrode/gate configured device, essentially replacing the traditional field emission tips in each hole with the diamond grit. The present art improves upon this effort by using highly conducting, H or D terminated diamonds and by coating the entire back electrode (the cathode) with diamond grit rather than filling lithographically patterned holes. It further improves upon the prior art by physically separating the gate electrode from cathode, eliminating the possibility of physical shorts by introducing an "air gap" between the electrical elements. The prior art resulted in a significant number of shorting, failed or otherwise defective devices due to the method of construction, which the present advances remedy entirely. Another example of prior art is the creation of a Spindt-type device in which diamond field emission tips were created by lithographic processes without a front gate electrode, the latter provided by a suspended TEM grid. However, in that case, a lithographic process with orders of magnitude fewer realizable field emission tips/cm² was demonstrated. Finally, the introduction of an integrated linear actuator to position the diamond grit cathode with respect to the gate electrode is a new art, as is the control of this separation using a PZT with an integrated feedback loop. The integration of the three above technologies comprises the sum of the new art, in which no lithography at any stage is required to create the field emission tips (the diamond grits), which are both conducting and intentionally H or D terminated, and in which a means of dynamically controlling the separation distance between tips and gate is introduced, which allows for shorting fault recovery and dynamic adjustment of electric field at the emission tips by variation of the distance between electrodes.

Textured Diamond Field Emission Cathode Device

The textured diamond field emission cathode device operates identically to the diamond grit-based device and has similar construction, to the extent that the textured diamond cathode is mounted on a manual or PZT actuated linear translator, the purpose of which is to adjust its position relative to a suspended gate electrode. In operation with the PZT, the PZT operation voltage—which sets the cathode-gate distance—is controlled using feedback from the emission current and/or extraction voltage in order to optimize the emission for a given bias voltage placed between the cathode and gate. However, the method of creating the textured diamond cathode itself and its physical properties as a monolithic, massively parallel array of field emission tips are entirely novel.

The prior art for the creation of field emission tips with tip dimensions ranging from atomic scale to nanometers relies on either a) lithographic techniques, including various forms of etching and pattern definition or b) the deposition of materials with inherently sharp features such as the aforementioned diamond grits, carbon nanotubes and so forth. The new method utilizes no lithographic device definition or any deposition steps (beyond that required to create the diamonds or diamond films, which can even occur naturally). Further, no traditional etching is performed, but rather a bombardment by hyperthermal, neutral atomic oxygen (AO) as follows:

1) An electrically conducting diamond crystal, single crystal film, polycrystalline film or UNCD film, with films >=500 nm thickness, or a batch of conducting diamond grits, is exposed to unidirectional bombardment by electrically neutral O with kinetic energy between 5 eV and 15 eV until troughs, such as those shown in the SEM micrograph are etched at least 500 nm deep. This step is carried out in PSI's patented FAST atom source, or equivalent. This step produces an array of sharp rods and cones on the diamond surface with a packing density of order $10^9$ cm$^{-2}$. The conductivity of the diamond is induced by its heavy doping with Boron, Phosphorus or Nitrogen.

2) The diamond material, thus textured, is heated to 550° C.<T<800° C. in a vacuum chamber, at which point it is exposed to a thermal beam of neutral atomic hydrogen and/or deuterium. The combination of H and/or D flux and exposure time is sufficient to coat the textured diamond in a monatomic layer of H or D, imparting an NEA surface to the diamond. The diamond is then cooled below 550° C., at which point the H/D exposure is switched off.

One difference between Step 1 and traditional oxygen plasma reactive ion etching (RIE) is that the O atoms are electrically neutral and that they are hyperthermal; that is, their kinetic energy causes them to impinge on the diamond from a single well-defined direction and with such energy as to be well beyond what is achievable by thermal heating, the directional atomic gas flow being well away from thermal equilibrium.

Besides cathode coatings, the disclosure describes a number of active devices useful for the low-power emission of electrons, ionization of neutral gases and spacecraft propulsion using electrodynamic tethers and related devices. Such devices are useful in a range of products such as mass spectrometers (both terrestrial and space-based), electrodynamic propulsion systems, plasma engines (for space exploration and satellites), particle accelerators, research instrumentation and, with some development, for novel, advanced medical imaging devices such as dynamically spatially tailored and ultrafast pulsed X-ray sources for stroboscopic medical imaging and cancer treatments.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A triple-point cathode coating comprising:
an electrically conductive adhesive medium;
electrically conductive NEA diamond particles cast or mixed with the adhesive medium;
electrically insulative NEA diamond particles cast or mixed with the adhesive medium; and
a plurality of exposed junctions between electrically conductive diamond particles and electrically insulative diamond particles to reduce any electrical charges on a structure coated with the coating.

2. The coating of claim 1 in which the electrically conductive NEA diamond particles contact electrically insulative NEA diamond particles at locations not submerged in the adhesive medium.

3. The coating of claim 1 in which the electrically conductive NEA diamond particles and the electrically insulative particles have a grit size of between 0.5 microns to 150 microns.

4. The coating of claim 1 in which the electrically conductive NEA diamond particles and the electrically insulative diamond particles are mixed together before casting or mixing them with the adhesive medium.

5. The coating of claim 1 in which the adhesive medium includes silver.

6. An ionizer comprising:
a substrate;
a triple-point cathode coating associated with the substrate, the coating including:
an electrically conductive adhesive medium,
electrically conductive NEA diamond particles cast or mixed with the adhesive medium,
electrically insulative NEA diamond particles cast or mixed with the adhesive medium, and
a plurality of exposed junctions between electrically conductive diamond particles and electrically insulating diamond particles to reduce any electrical charges on the substrate.

7. The ionizer of claim 6 further including:
a conducting gate electrode supported above the coating; and
a voltage source connected between the gate electrode and the coating to produce ions by field desorption on the diamonds and subsequent electron or ion impact ionization on neutral adsorbed or gas phase species to produce further ions.

8. The ionizer of claim 7 further includes a piezoelectric material between the substrate and the coating.

9. The ionizer of claim 8 further including a voltage source for the piezoelectric material to adjust the distance between the gate electrode and the diamond coating to optimize field emissions from the coating.

10. The ionizer of claim 6 further including an electrically conducting layer behind the coating.

11. The ionizer of claim 6 in which the electrically conductive NEA diamond particles contact electrically insulative NEA diamond particles at locations not submerged in the adhesive medium.

12. The ionizer of claim 6 in which the electrically conductive NEA diamond particles and the electrically insulative diamond particles have a grit size of between 0.5 microns to 150 microns.

13. The ionizer of claim 6 in which the adhesive medium includes silver.

14. A method of producing a triple-point cathode, the method comprising:
preparing an electrically conductive adhesive medium;
casting or mixing electrically conductive NEA diamond particles with the adhesive medium; and
casting or mixing electrically insulative NEA diamond particles with the adhesive medium; and
wherein there are a plurality of exposed junctions between the electrically conductive NEA diamond particles and the electrically insulative NEA diamond particles.

15. The method of claim 14 in which the electrically conductive NEA particles contact electrically insulative NEA diamond particles at locations not submerged in the adhesive medium.

16. The method of claim 14 in which the electrically conductive NEA diamond particles and the electrically insulative particles have a grit size of between 0.5 microns to 150 microns.

17. The method of claim 14 in which the electrically conductive NEA diamond particles are the electrically insulative particles are mixed together before casting or mixing them with the adhesive medium.

18. The method of claim 14 in which the adhesive medium includes silver.

19. The method of claim 14 in which preparing the adhesive medium includes mixing a two part epoxy.

20. The method of claim 14 in which the electrically conductive NEA diamond particles are mixed with electrically insulative NEA diamond particles, then that mixture is mixed with the adhesive medium, and then additional adhesive is added to that mixture to produce a low-viscosity final mixture.

* * * * *